United States Patent
Kaytaz et al.

(10) Patent No.: US 9,402,057 B2
(45) Date of Patent: Jul. 26, 2016

(54) INTERACTIVE AVATARS FOR TELECOMMUNICATION SYSTEMS

(75) Inventors: Bulent Kaytaz, Istanbul (TR); C. Bora Eliacik, Istanbul (TR); Alper Aykac, Istanbul (TR); Serkant Uluderya, Ankara (TR); Fatih Cakici, Istanbul (TR); Ceyda Idilkurt, Ankara (TR); Okan Tekdas, Ankara (TR); Tolga Tanriverdi, Istanbul (TR); Galip Dursun, Istanbul (TR); Neva Ozcu, Istanbul (TR)

(73) Assignee: ARGELA YAZILIM VE BILISIM TEKNOLOJILERI SAN. VE TIC. A.S. (TR)

( * ) Notice: Subject to any disclaimer, the term of this patent is extended or adjusted under 35 U.S.C. 154(b) by 952 days.

(21) Appl. No.: 13/437,904

(22) Filed: Apr. 2, 2012

(65) Prior Publication Data

US 2013/0258040 A1    Oct. 3, 2013

(51) Int. Cl.
| | | |
|---|---|---|
| H04N 7/14 | (2006.01) |
| H04N 7/15 | (2006.01) |
| H04L 29/06 | (2006.01) |
| H04M 3/42 | (2006.01) |
| H04W 4/20 | (2009.01) |

(52) U.S. Cl.
CPC ............ *H04N 7/157* (2013.01); *H04L 65/1069* (2013.01); *H04L 67/38* (2013.01); *H04M 3/42068* (2013.01); *H04L 65/1046* (2013.01); *H04W 4/206* (2013.01)

(58) Field of Classification Search
None
See application file for complete search history.

(56) References Cited

U.S. PATENT DOCUMENTS

| | | | | |
|---|---|---|---|---|
| 7,913,176 | B1* | 3/2011 | Blattner | G06Q 10/107 715/758 |
| 2007/0188502 | A1* | 8/2007 | Bishop | G06T 13/40 345/473 |
| 2009/0164916 | A1* | 6/2009 | Jeong | A63F 13/12 715/753 |
| 2009/0325647 | A1* | 12/2009 | Cho | H04M 1/72519 455/567 |
| 2010/0198924 | A1* | 8/2010 | Collet | G06Q 10/107 709/206 |
| 2011/0296324 | A1* | 12/2011 | Goossens | G06Q 10/10 715/763 |
| 2012/0290950 | A1* | 11/2012 | Rapaport | H04L 51/32 715/753 |

OTHER PUBLICATIONS

"SIP: Session Initiation Protocol," RFC 3261, published Jun. 2002, 269pgs.
"RTP: A Transport Protocol for Real-Time Applications," RFC 3550, published Jul. 2003, 89pgs.
"Hypertext Transfer Protocol—HTTP/1.1," RFC 2616, published Jun. 1999, 114pgs.
"File Transfer Protocol (FTP)," RFC 959, published Oct. 1985, 61pgs.
"Simple Mail Transfer Protocol," RFC 5321, published Oct. 2008, 96pgs.
"Post Office Protocol—Version 3," RFC 1939, published May 1996, 23pgs.

(Continued)

*Primary Examiner* — Maria El-Zoobi
(74) *Attorney, Agent, or Firm* — IP Authority, LLC; Ramraj Soundararajan

(57) ABSTRACT

This invention is an apparatus an methods which integrates users' avatars into IP-based calling and messaging telecommunication services in such a way that avatar can be animated in real-time according to spoken words, anticipated gestures and pre-set and stored emotions. The invention includes an online editor to generate and customize users avatars.

23 Claims, 6 Drawing Sheets

(56) References Cited

OTHER PUBLICATIONS

"Internet Message Access Protocol—Version 4rev1," RFC 3501, published Mar. 2003, 108pgs.

"Structure and Identification of Management Information for TCP/IP-based Internets," RFC 1155, published May 1990, 22pgs.
<http://www.digimi.com/newsite/presite/home.jsp>, 1 pg.
<http://tr.imvu.com/>, 1 pg.
<http://www.bluemars.com/>, 2pgs.

* cited by examiner

INTERACTIVE AVATARS FOR TELECOMMUNICATION SYSTEMS

BACKGROUND OF THE INVENTION

1. Field of Invention

The present invention relates generally to the field of telephony services. More specifically, the present invention relates to a telecommunications service provider incorporating an animated avatar during a communication service.

2. Discussion of Prior Art

In computing, avatar is a term generally used to represent a personalized digital representation of an Internet user. The avatar of a user can take either a two-dimensional or a three-dimensional form. Avatars have been in use in the Internet forums, Internet chat programs, Internet messaging programs, blogs, online games, online worlds, portals. Besides, avatars can be used as automated online assistants in websites.

With the widespread use of the social networks, forums, etc. there emerged a need to create an online identity other than the actual photo or video of a user which represents people's different components of persona. The traditional form of avatars is a small square-shaped picture. Some forums allow the user to upload an avatar image or select an avatar from a preset list.

Some avatars used in different environments can be animated, consisting of a sequence of multiple images played repeatedly. There exist other avatar systems where a pixelized two-dimensional or three-dimensional representation of a person or creature is used, which can then be customized to the user's wishes.

Nowadays, avatars are being used in many different areas. They can be used as virtual embodiments of agents, which are driven more or less by artificial intelligence rather than real people. Automated online assistants are examples of avatars in this way. Such avatars are used by organizations as a part of automated customer services in order to interact with consumers and users of services. Alternatively, they can be used to simply conceal the identity of a real agent.

In some gaming applications and online worlds, people can use their self-created two- or three dimensional human or imaginary representations of their inworld self. In some of these applications, avatars' appearance can be customized. Creation steps of the mentioned avatars can vary from service to service. In some of these services, users can create their own avatars by choosing one or more of the given avatar templates. After choosing the preferred avatar template, the user can add some appearance features (eye color, hair color, facial features, etc.) to their avatars according to his/her wishes; this newly created avatar can be animated or non-animated. In other services, the users can upload their photographs and the system running behind converts it to a two- or three-dimensional avatar. The avatar may be realistic or unrealistic.

Using avatars in telephony services is a promising area. It offers to users an alternative way to communicate. Different than the common and traditional communication services, users can express themselves with their two- and/or three-dimensional interactive avatars while using telephony services. There are services such as Digimi and IMVU offering 3D avatar creation and using 3D avatars in online virtual worlds. Creating two and/or three dimensional avatars and using them in online social virtual worlds allowing user-created content is well known and documented in prior-art. For example Blue Mars provides users a 3D massively multiplayer virtual world platform where users can customize clothing, hair, body shape, etc. and communicate with each other using local text and voice chat through the online platform.

Whatever the precise merits, features and advantages of the above cited references, none of them achieves or fulfills the purposes of the present invention.

Embodiments of the present invention are an improvement over prior art systems and methods.

SUMMARY OF THE INVENTION

A system and method for incorporating in real-time an animated avatar into telephony services (call, messaging, etc.) between two IP clients such that avatars of both parties are viewable on the IP clients' communication device wherein the avatars are created using a web and mobile based portal. Created avatars are stored in the service providers' database and delivered through appropriate call control and signaling mechanisms.

In one embodiment, a computer-based method is implemented at a server facilitating communication between a first and second IP client, said method comprises: said server receiving a first pre-assigned key at said server from said first IP client, said first IP client communicating with said second IP client, said server storing a plurality of avatars and a plurality of emotions, at least one avatar among said stored plurality of avatars in said server associated with said first IP client and each emotion associated with a pre-assigned key; said server identifying a first emotion corresponding to said received first pre-assigned key; said server retrieving data corresponding to said first emotion and modifying avatar associated with said first IP client to show said first emotion based on said retrieved data corresponding to said first emotion; and said server rendering said modified avatar associated with said first IP client showing said first emotion at said second IP client.

In another embodiment, a computer-based method is implemented at a server facilitating communication between a first and second IP client, said server storing a plurality of avatars and data corresponding to a plurality of moods, said method comprises: said server rendering, at said second IP client, an avatar modified to represent a first mood associated with said first IP client, said first IP client communicating with said second IP client; said server receiving an indication of alteration of a mood from said first mood to a second mood based on a detection of a change in voice tone at said first IP client; said server retrieving data corresponding to said second mood and modifying said avatar associated with said first IP client to reflect said second mood; and said server rendering said modified avatar reflective of said second mood at said second IP client.

In another embodiment, a computer-based method is implemented at a server facilitating communication between a first and second IP client, said server storing a plurality of avatars and data corresponding to a plurality of seasons, said method comprises: said server rendering, at said second IP client, an avatar modified to represent a first season associated with said first IP client, said first IP client communicating with said second IP client; said server receiving an indication of alteration of a season from said first season to a second season; said server retrieving data corresponding to said second season and modifying said avatar associated with said first IP client to reflect said second season; and said server rendering, at said second IP client, said modified avatar reflective of said second season.

In another embodiment, a computer-based method is implemented at a server facilitating communication between a first and second IP client, said server storing a plurality of avatars, said method comprising: said server rendering, at said second IP client, an avatar associated with said first IP client, said first IP client communicating with said second IP client; said server receiving an indication of a change in voice tone, sent from said first IP client, corresponding to a physical condition; said server retrieving data corresponding to an effect indicative of said physical condition and modifying said avatar associated with said first IP client to reflect said physical condition; and said server rendering, at said second IP client, said modified avatar reflective of said physical condition.

In another embodiment, a computer-based method is implemented at a server facilitating communication between a first and second IP client, said server storing a plurality of avatars and data corresponding to a plurality of interactions, said method comprising: said server rendering, at said second IP client, an avatar associated with said first IP client, said first IP client communicating with said second IP client; said server receiving an indication of an physical interaction, at said second IP client, with said avatar associated with said first IP client; said server retrieving data corresponding to said physical interaction and modifying said avatar associated with said first IP client to reflect said interaction; and said server rendering, at said second IP client, said modified avatar reflective of an image corresponding to said physical interaction.

DESCRIPTION OF THE PREFERRED EMBODIMENTS

Figure 1:
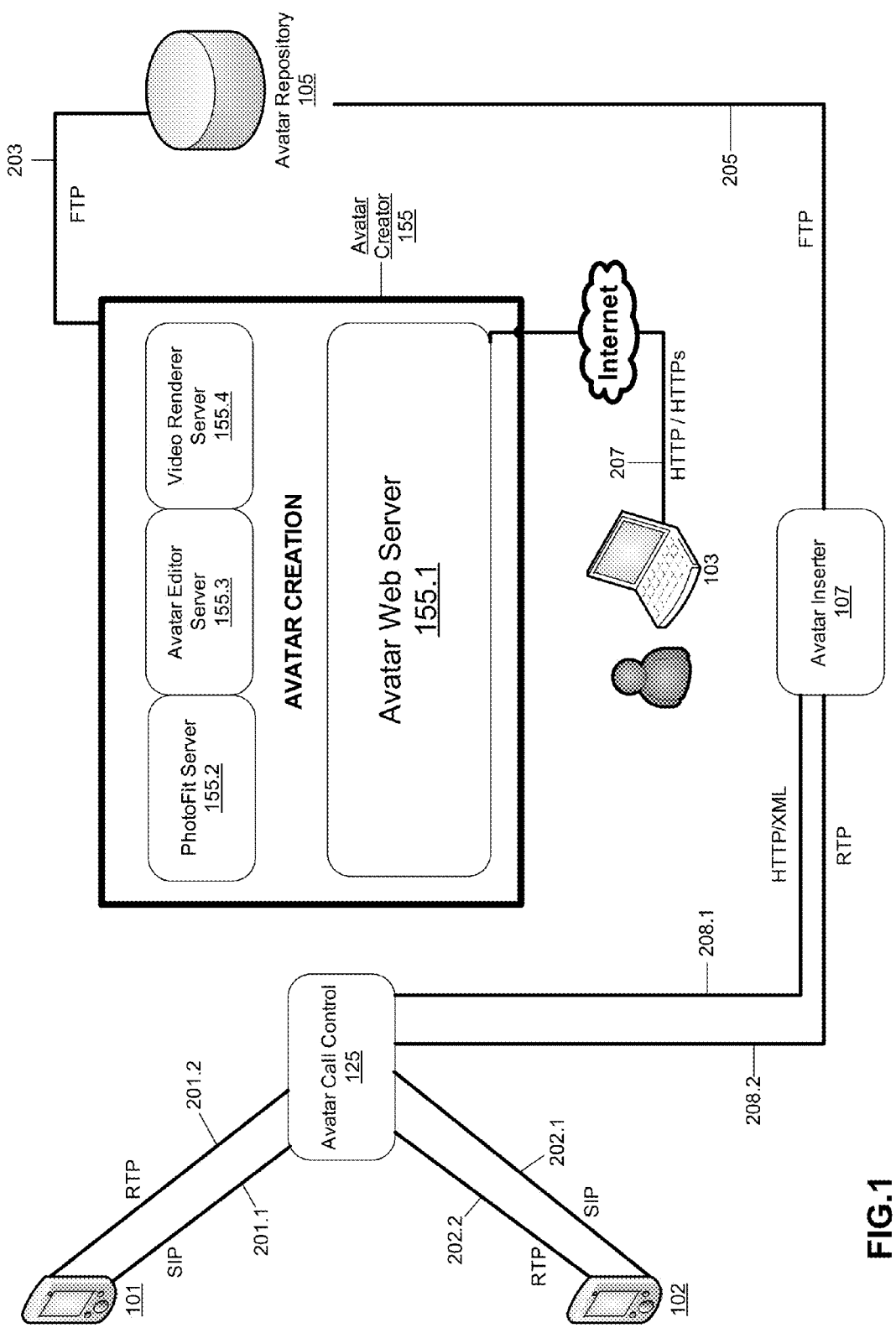
FIG. 1: illustrates a block diagram of the Avatar Calling Service (ACS) infrastructure components.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

An exemplifying network of an IP service provider offering Avatar-Calling service is illustrated in FIG. 1. This service provider can be a cellular operator (3G, 4G or beyond) a wireless operator or a Voice over IP (VoIP) operator who all of which are able to offer voice services over IP. In FIG. 1, the calling party 101 initiates a call to called party 102. Called party 102 has graphics and/or video display capabilities on his/her communication device. A prior art voice service between 101 and 102 typically employs Session Initiation Protocol (SIP) of prior art on link 201.1.

The called party 102 has an application which transforms user's spoken words into a speaking and animated avatar. The avatar information is retrieved from an Avatar Web Portal. Stock footage for lip-sync operations is retrieved from an Avatar Repository while integration of all that information with real-time speech is performed by the application on the user's device.

Functions 202.1 is for call control and Real Time Protocol (RTP) and 201.2/202.2 is for network signaling in order to communicate with Avatar Call Control Server 125.

Avatar Web Portal 155 is where user 103 can create his/her avatar. User can remotely access Avatar Web Portal 155 on a Web Server 155.1 over Hypertext Transfer Protocol (HTTP) on link 207 where this link can be over the public Internet or a private IP connection. User 103 uses his/her Smartphone, a software-based telephone, a cellular telephone, a personal computer (PC), a laptop, a personal digital assistant (PDA), an IP-based phone, a personal tablet computer which has a web client.

Avatar Web Portal 155, has several components. 155.1 is a function used for the user to upload a photograph of his/her face, which will be used as a basis for the avatar and to interact with the Avatar Creator. The uploaded photograph is sent from Avatar Web Server 155.1 to Avatar Repository 105 using link 203 via a communication protocol such as the File Transfer Protocol (FTP).

Figure 3:
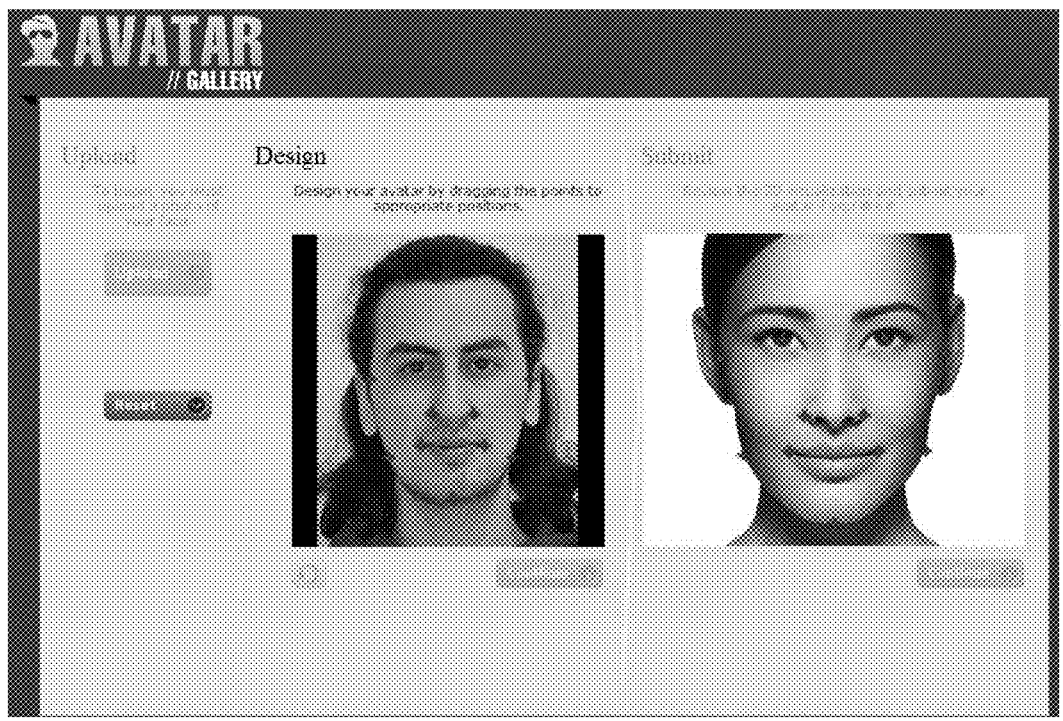
FIG. 3: illustrates an example user interface of Avatar Creator.

Avatar Web Portal 155 has Photo-fit Server 155.2 where the user marks key facial features (eyes, ears, mouth, chin, etc.) using a graphical interface similar to one shown in FIG. 3. In one embodiment, these markings are performed manually, wherein the software may not have a capability to recognize key features. However, in another embodiment, there may be a special logic, such as an artificial intelligence algorithm, in Photo-fit Server 155.2 to automatically recognize key facial features. The location of these features is used to generate actual coordinates of user's facial features which will eventually be used to animate facial expressions. Using this information, Photofit Server 155.2 generates a 3D head-model. Subsequently Avatar Web Portal 155 sends the generated 3D head model to Avatar Repository 105 using link 203 via a communication protocol such as FTP.

Avatar Editor Server 155.3 is where facial features of 3D head model can be further edited. For example, user 103 can view his/her 3D head-model through Web Server 155.1's interface and request to enlarge lips. As a response to this request Avatar Web Server 155.1 request Avatar Editor Server 155.3 to perform requested editing. By extracting the 3D head-model from Avatar Repository 105, and performing morphing operations, Avatar Editor Server 155.3 alters 3D head-model and stores back into Avatar Repository 105 using link 203. Avatar Editor Server 155.3 can perform race, age, hair and/or eye color changing, hair styling and other cosmetic alterations of the head depending on service provider's set of offerings.

Video Renderer Server 155.4 is where pre-encoded stock footages for lip, face and body movement are created and transferred to Avatar Repository 105 using link 203 over a communication protocol such as FTP.

Pre-encoded stock footages for lip, face and body movement are used in the Avatar-Calling Service (ACS). For example when user 101 makes a phone call to user 103 wherein the avatar of at least the calling party is involved in the call, the lips of the called party's avatar are synchronized to the speech pattern of the called party in real-time (i.e., during the call) by using speech recognition techniques. Similarly, the face and body movements of the called party are synchronized to that of the avatar during the call based on the words used and the speech pitch fluctuations (e.g., laughter or anger) during the call. The required files for the lip, face and body movement synchronization operations are being taken from Avatar Repository 105 in this embodiment. If both the calling and called parties use the ACS, then reciprocally the same type of avatar features are transmitted to the other side (i.e., calling party's avatar is sent to called party and called party's avatar is reciprocally sent to calling party).

Avatar Inserter 107 receives required avatar files from Avatar Repository 105 for the lip, face and body movement operations over link 205 using a communication protocol such as FTP. Avatar Inserter 207 sends the files taken from Avatar Repository 105 to Avatar Call Control 125 using link 208.2 over a communication protocol such as RTP. Avatar Call Control is a key component which inserts required avatars and files (videos, emotions, etc.) into required protocol streams. Avatar Call-Control 125 sends each IP client's avatars to both IP client's communication device over link 202.2/201.2 using a communication protocol such as RTP In one embodiment, users can send emotions (happy, angry, scared, surprised, etc.) with their avatars through In-band Dual-Tone Multi-Frequency Signaling (DTMF) during an Avatar-Call. Pre-set emotions are assigned to keys of the keypad. For example, if the user presses a key during Avatar-Call, an emotion assigned to that pressed key is automatically animated by the user's avatar. This feature is also provided by Avatar Call Control.

In this embodiment, a computer-based method is implemented at a server facilitating communication between a first and second IP client, said method comprises: said server receiving a first pre-assigned key (via DTMF) at said server from said first IP client, said first IP client communicating with said second IP client, said server storing a plurality of avatars and a plurality of emotions, at least one avatar among said stored plurality of avatars in said server associated with said first IP client and each emotion associated with a pre-assigned key; said server identifying a first emotion corresponding to said received first pre-assigned key; said server retrieving data corresponding to said first emotion and modifying avatar associated with said first IP client to show said first emotion based on said retrieved data corresponding to said first emotion; and said server rendering said modified avatar associated with said first IP client showing said first emotion at said second IP client.

In one embodiment, during an Avatar-Call, avatars can automatically alter their moods by detecting the voice tone of the user. For example, if the user has a happy/cheerful voice tone, the mood of his/her avatar automatically changes to happy/cheerful and the lips are turned up etc. Note that a user can have multiple avatars so that a different avatar is sent to a different called party (i.e., a cute avatar to your girl friend and your formal avatar to your colleagues etc.)

In this embodiment, a computer-based method is implemented at a server facilitating communication between a first and second IP client, said server storing a plurality of avatars and data corresponding to a plurality of moods, said method comprises: said server rendering, at said second IP client, an avatar modified to represent a first mood associated with said first IP client, said first IP client communicating with said second IP client; said server receiving an indication of alteration of a mood from said first mood to a second mood based on a detection of a change in voice tone at said first IP client; said server retrieving data corresponding to said second mood and modifying said avatar associated with said first IP client to reflect said second mood; and said server rendering said modified avatar reflective of said second mood at said second IP client.

Although we have so far described only face and head modeling same techniques can be easily applied to generate 3D body modeling and cosmetic changes to the body using the same principles and broadly using the same or similar system components described above.

FIG. 3 illustrates a non-limiting user interface of Avatar Web Portal wherein the user can create and customize his/her two- or three-dimensional avatar(s). The user can upload his/her photograph(s) by using the 'Upload' button. After pressing the 'Upload' button, the user is asked to choose a file from his/her device. The uploaded photograph is located on the left side the guiding visualization. The user can mark key facial features (eyes, ears, mouth, chin, etc.) properly by looking at the guiding visualization. The 'Reset' button deletes the uploaded photograph and enables the user to upload a new photograph from which a 3D model is generated. Pressing the 'Continue' button initializes the process of 3D model generation.

Figure 4:
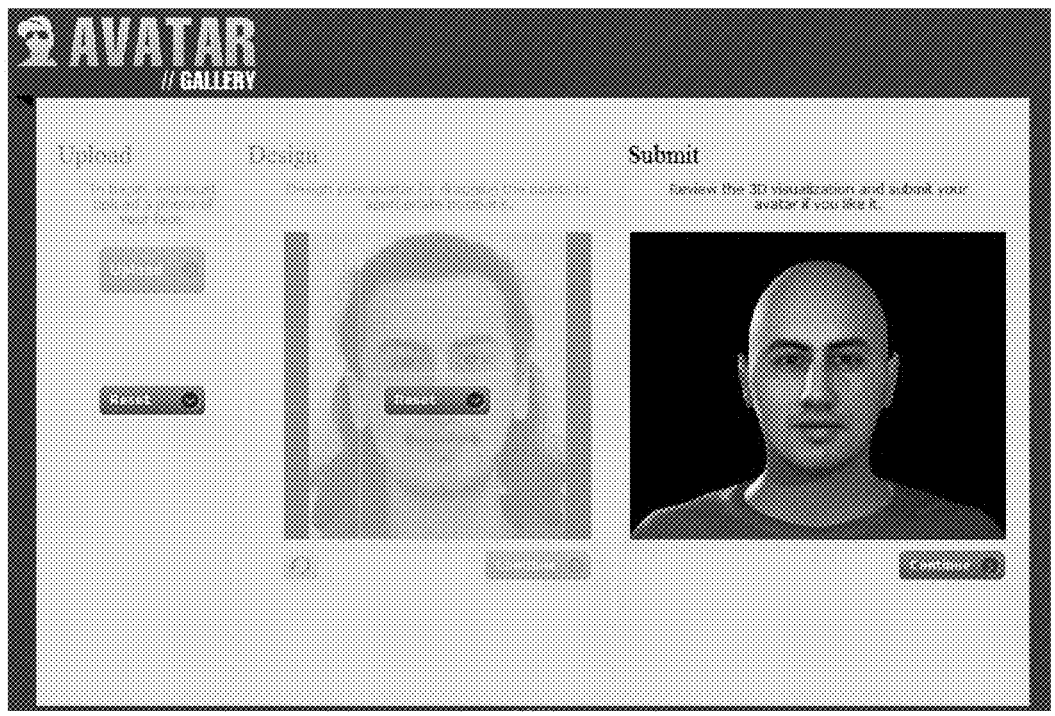
FIG. 4: illustrates the 3D head model generated by Avatar Creator.
Figure 7:
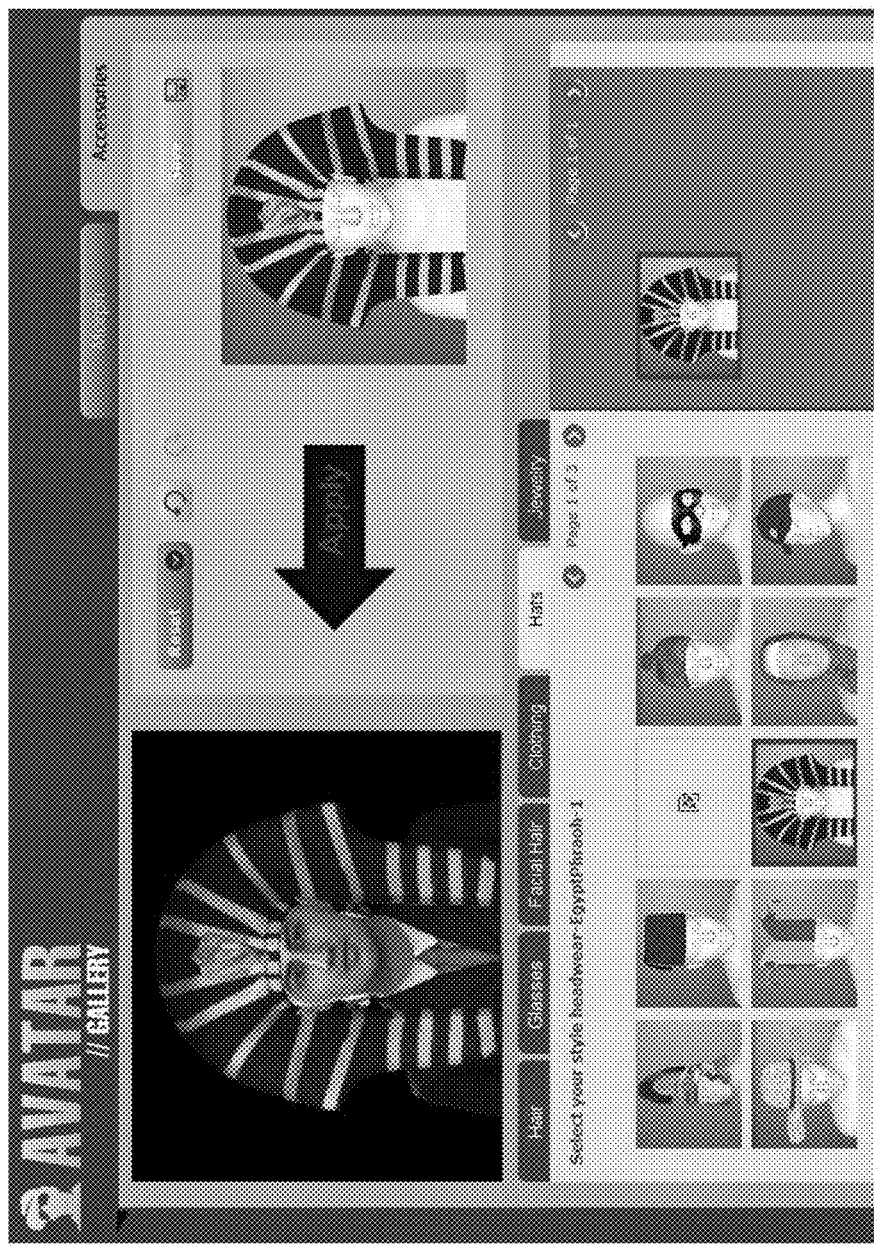
FIG. 7: illustrates an example user interface of Avatar Accessories.

An example of the 3D head model generated by the Avatar Creator can be seen in FIG. 4. In case of marking the key facial features wrong, user can start marking operations over. Although we have so far described creation of an avatar from scratch, users can also choose a pre-created avatar from Avatar Gallery using Avatar Web Portal and perform customization operations on the selected pre-created avatar. Users can change race, age, gender, eye color and facial features (face shape, eyes, nose, cheeks, mouth, chin, etc.) of their avatars depending on service provider's set of offerings. Besides, accessories can be used to enrich the appearance of avatars. For example, users can choose hair styles, eye glasses, facial hair, clothing, hats and other accessories from the set of offerings for their avatars as seen on FIG. 7.

A user can create avatars and accessories for his/her avatar(s) through Avatar Web Portal 155 and/or upload pre-made accessories to Avatar Web Portal. Created and/or uploaded avatars and accessories can be shared with other users or sold to other users via Avatar Web Server 155.1. Each user of Avatar Web Portal 155 can see all of his/her avatars and accessories in his/her own gallery. A user can customize his/her avatars' visibility in Avatar Web Portal. The avatars created by users can be rated by other users.

A user can create a wardrobe for his/her avatar(s) and add items for future and/or present use. Wardrobe of a user can be shared with other users or can be private.

Users can give moods to their avatars through Avatar Web Portal 155. These moods (sad, happy, excited, sleepy, etc.) can also be applied to the services in which avatars are used. In one embodiment, users can give virtual human-like functions to their avatars depending on service provider's set of offerings. For example, a user can make his/her avatar gain weight by a 'feed' function: According to the frequency of feeding action, the avatars can gain or lose weight. The appearance of virtual human-like functioned avatars can change automatically depending on the seasons. For instance an avatar can have a runny nose in winter or a suntan in summer.

In one embodiment, a computer-based method is implemented at a server facilitating communication between a first and second IP client, said server storing a plurality of avatars and data corresponding to a plurality of seasons, said method comprises: said server rendering, at said second IP client, an avatar modified to represent a first season associated with said first IP client, said first IP client communicating with said second IP client; said server receiving an indication of alteration of a season from said first season to a second season; said server retrieving data corresponding to said second season and modifying said avatar associated with said first IP client to reflect said second season; and said server rendering, at said second IP client, said modified avatar reflective of said second season.

In another embodiment, a computer-based method is implemented at a server facilitating communication between a first and second IP client, said server storing a plurality of avatars, said method comprising: said server rendering, at said second IP client, an avatar associated with said first IP client, said first IP client communicating with said second IP client; said server receiving an indication of a change in voice tone, sent from said first IP client, corresponding to a physical condition; said server retrieving data corresponding to an effect indicative of said physical condition and modifying said avatar associated with said first IP client to reflect said physical condition; and said server rendering, at said second IP client, said modified avatar reflective of said physical condition.

In another embodiment, a computer-based method is implemented at a server facilitating communication between a first and second IP client, said server storing a plurality of avatars and data corresponding to a plurality of interactions, said method comprising: said server rendering, at said second IP client, an avatar associated with said first IP client, said first IP client communicating with said second IP client; said server receiving an indication of an physical interaction, at said second IP client, with said avatar associated with said first IP client; said server retrieving data corresponding to said physical interaction and modifying said avatar associated with said first IP client to reflect said interaction; and said server rendering, at said second IP client, said modified avatar reflective of an image corresponding to said physical interaction.

After being registered to Avatar Web Portal 155, users can create a contact list consisting of other Portal users they are communicating with. Through the contact list, users can create play-rules and assign different avatar models to different users existing in their contact list. In Avatar-Calling Service and/or Avatar-Messaging Service, users can insert specific avatars in their calls and/or messages which are specific to people.

In one embodiment, avatars can participate in online activities through Avatar Web Portal. Users can view other avatars' participations. For example an avatar can go to the gym or a restaurant and see other avatars available there. Avatars can be added as friends by other avatars present in the Portal.

In one embodiment, users earn virtual money depending on their activity stream on Avatar Web Portal, Avatar-Messaging and Avatar-Calling services. The virtual money can be used in Avatar Web Portal. As an example, users can buy new avatars, accessories and/or use the virtual money for the activities available in Avatar Web Portal.

Figure 2:
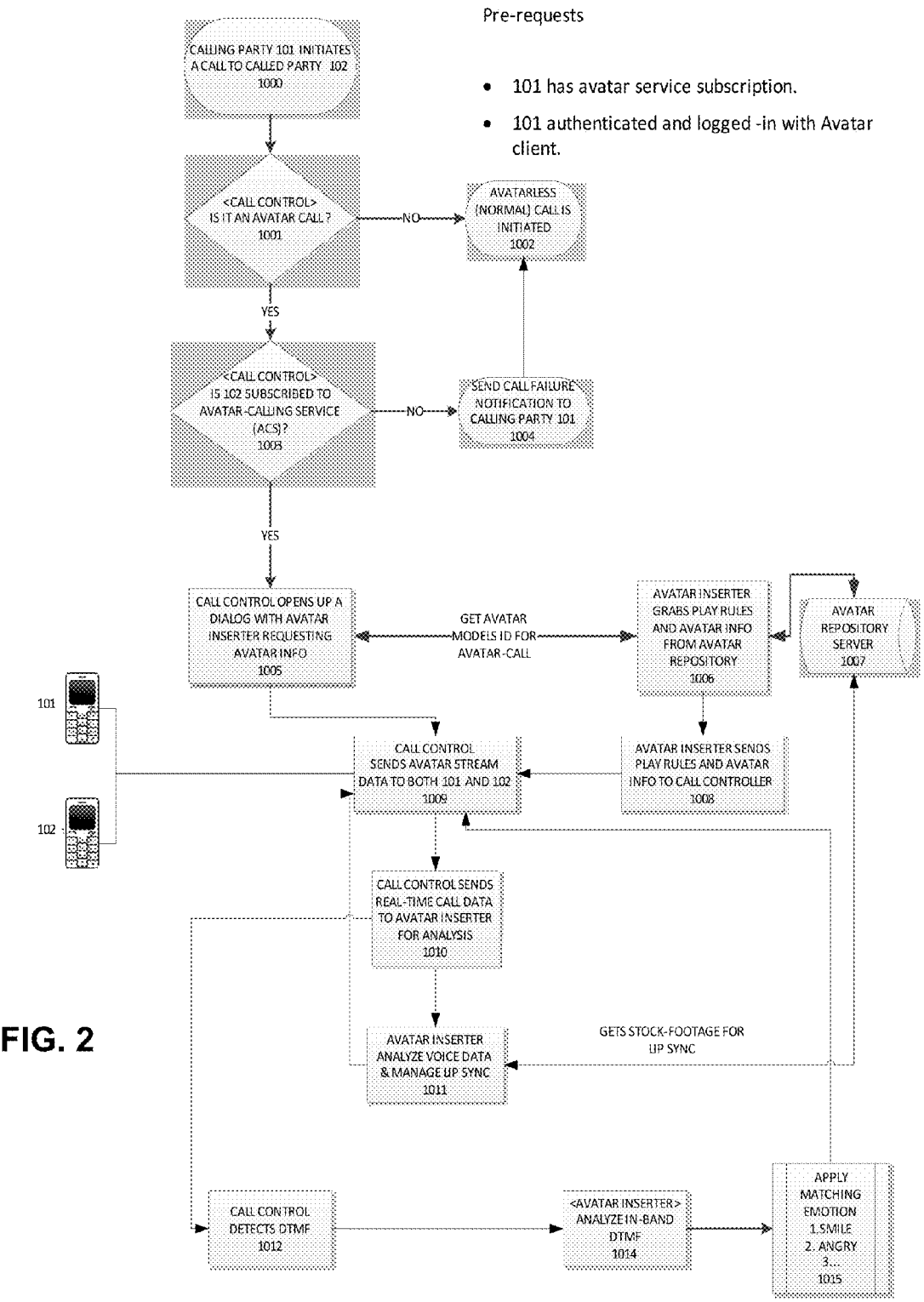
FIG. 2: illustrates a flow chart showing delivery of Avatar Calling Service.

A flow diagram of Avatar Calling Service is shown in FIG. 2. In step 1000, calling party 101 initiates an Avatar Call to called party 102. The call may be an audio call or alternatively a video call with both audio and video components. In step 1001, Avatar Call Control 125 checks to determine if the call is an Avatar Call. If it is not an Avatar Call, in step 1002, it fall backs to default call (i.e., an avatarless call). If it is an Avatar Call, Avatar Call Control 125 checks to determine if user 102 is subscribed to Avatar Calling Service in step 1003. If user 102 has not subscribed to Avatar Calling Service, while party 101 requested an Avatar Call, it sends an Avatar Call failure notification to calling party 101 in step 1004. At this point, a default call (avatarless call) is initiated in step 1002. If user 102 is subscribed to Avatar Calling Service, in step 1005 Avatar Call Control 125 connects to Avatar Inserter 107 requesting avatar related information about users 101 and 102 in turn, Avatar Inserter 107, in step 1006, grabs play-rules and avatar graphics info from Avatar Repository 105. Avatar Repository 105 sends required information in step 1007 to Avatar Inserter 107. In turn, Avatar Inserter 107 sends these play-rules and avatar info to Avatar Call Control 125 in step 1008. Avatar Inserter 107 may request information from Avatar Repository 105 using a query language such as SQL and/or a communication protocol such as FTP.

Upon receiving play-rules and avatar info, Avatar Call Control 125 sends streamed avatar data to both user 101 and 102 in step 1009. This step can be conducted prior to real-time calling data is being sent to prepare the call for being an Avatar Call.

In real-time, Avatar Call Control 125 receives calling data from users 101 and 102 and sends this data to Avatar Inserter 107 for avatar processing in step 1010. The data Avatar Inserter 107 receives can be either voice/video data or DTMF digits. In step 1011, Avatar Inserter 107 receives voice/video data in which case Avatar Inserter 107 analyses data and manages lip-synch and sends lip-synch info back to Avatar Call Control 125.

In step 1012, Avatar Call Control 125 detects Avatar Call related DTMF digits in which case it sends to Avatar Inserter 107 in step 1013. Avatar Inserter analyzes DTMF digits in step 1014 and applies matching emotions in step 1015 and sends them back to Avatar Call Control 125 in step 1009, which in turn sends to users 101 and 102. These matching emotions are obtained from Avatar Repository 105 and sent to Avatar Call Control 125, and in step 1009 Avatar Call Control 125 in turn sends these emotions back to users 101 and 102.

Figure 5:
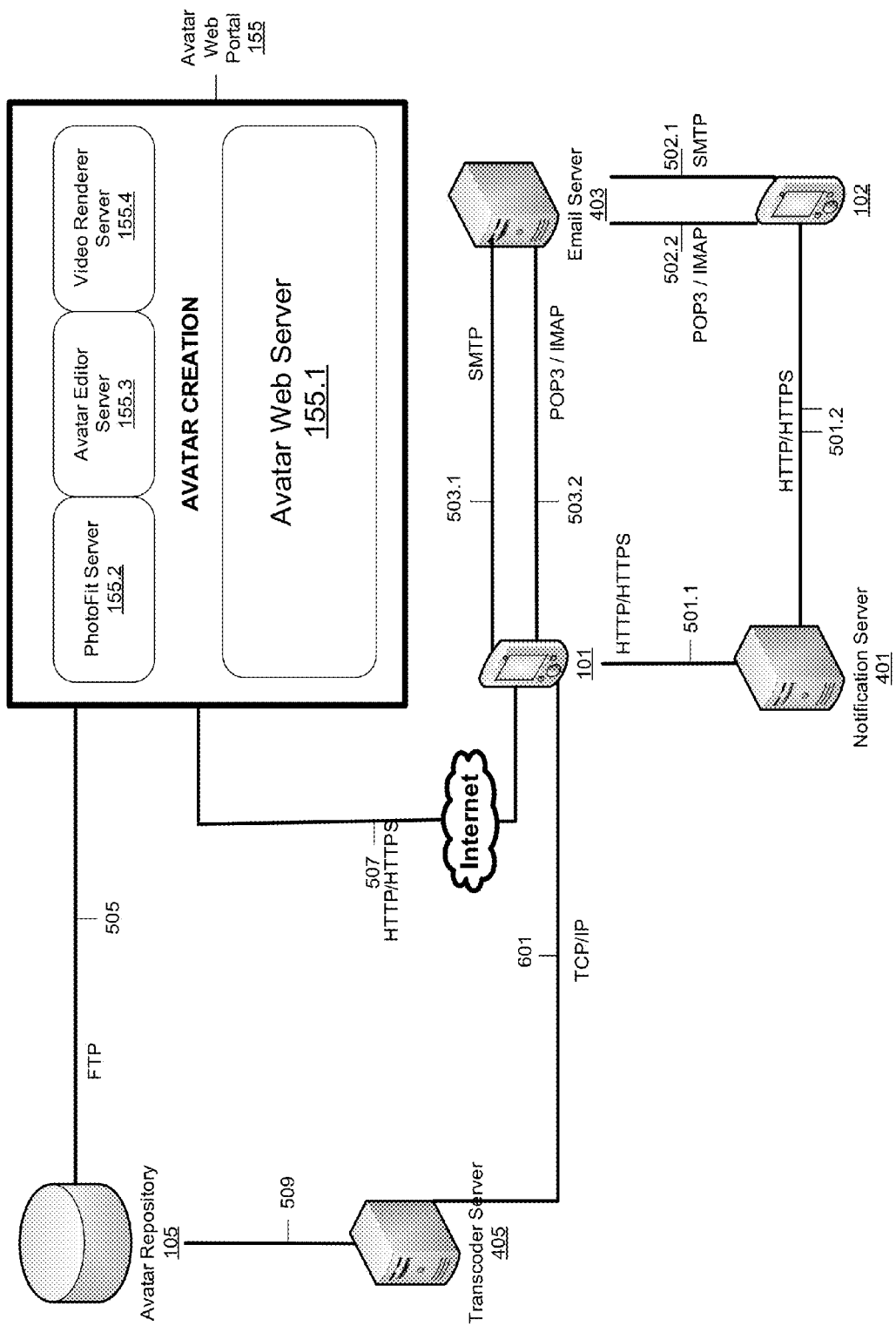
FIG. 5: illustrates a block diagram of the Avatar Messaging Service (AMS) infrastructure components.

An exemplifying network of an IP service provider offering Avatar Messaging service is illustrated in FIG. 5. This service provider can be a cellular operator (3G, 4G or beyond) a wireless operator or a VoIP operator who is able to offer voice services over IP. In FIG. 5, the messaging party 101 sends a message to messaged party 102. Both messaging party 101 and messaged party 102 have graphics/video display capabilities on his/her communication device.

The messaged party 102 has an application which transforms user's written messages into a speaking and animated avatar. The stock footage for lip-sync operations is retrieved from an Avatar Repository while integration of all that information with messaging service is performed by the application on the user's device.

The Avatar-Messaging Service inserts an avatar into the message in which the avatar reads the message. Doing so, in addition to the text of the message there is an avatar reading the message. A key innovation in this service is a Transcoder Server which reduces the size of the avatar created through Avatar Web Portal. The lip-syncs are pre-stored into Avatar Repository and matched to the words of the text. The application downloaded on the user's end device integrates the avatar en the lip-syncs according to the message content.

A prior art voice service between 101/102 and Email Server 403 typically employs Simple Mail Transfer Protocol (SMTP) 503.1/502.1 for sending mail messages and Post Office Protocol 3 (POP3) and/or Internet Message Access Protocol (IMAP) 503.2/502.2 for retrieving mail messages. Both 101 and 102 employs HTTP/HTTPs 501.1 and 501.2 in order to communicate with Notification Server 401. When 101 sends an email message to 102, Notification Server 401 automatically gets triggered and sends notification message to 102. Note that the functionality of the Notification Server and Email Server are described in the prior art.

Avatar Web Portal 155 is where a user can create his/her avatars. User can remotely access Avatar Web Portal 155 through Web Server 155.1 over HTTP/HTTPs 207, using his/her Smartphone, a software-based telephone, a cellular telephone, a personal computer (PC), a laptop, a personal digital assistant (PDA), an IP-based phone, a personal tablet computer 103 or using web access. 101 connects to Avatar Web Portal 155 using HTTP/HTTPs 507 in order to choose an avatar from his/her avatar gallery. Avatar Web Portal 155 connects to Avatar Repository via a communication protocol such as FTP 505 in order to get avatar images. After choosing the preferred avatar, it is sent to Transcoder Server 405 from Avatar Repository 105 via link 509 for the optimization operations. Transcoder Server 405 is needed because the generated avatars yield large files that are not suitable to be used in conjunction with messaging service. Hence, the generated avatar must be converted to a file which can be properly seen on user's device and must be reduced in size in such a way that in can properly be integrated in messaging services.

Transcoder Server 405 sends the optimized avatar files to user 101's device using link 601 through Transmission Control Protocol/Internet Protocol (TCP/IP)[11]. Concurrently, preferred avatar model becomes available to use in Avatar Messaging Service.

Figure 6:
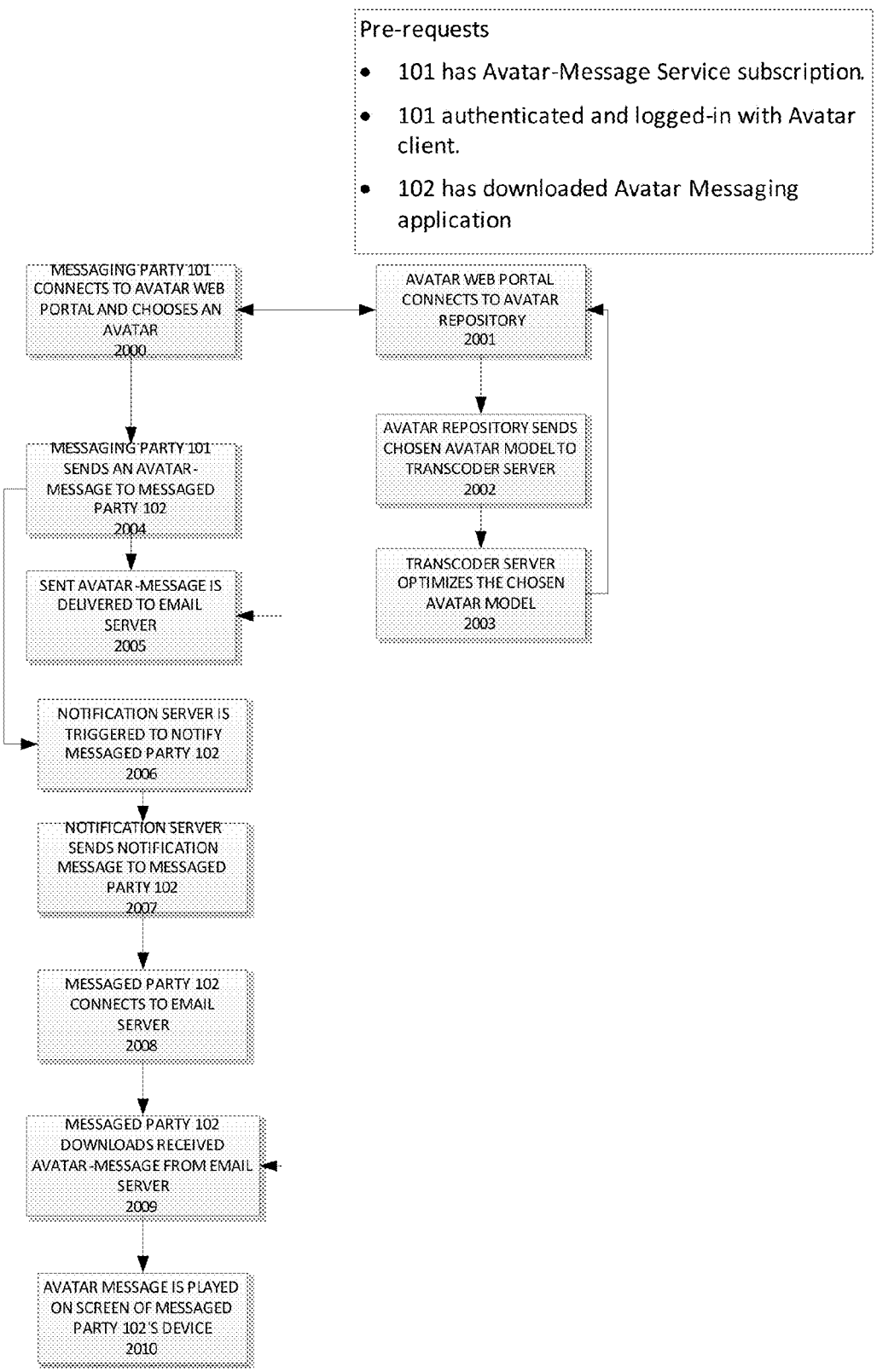
FIG. 6: illustrates a flow chart showing delivery of Avatar Messaging Service.

A representation of the Avatar-Messaging Service algorithm, showing the steps of Avatar-Messaging Service can be seen in FIG. 6. In Avatar-Messaging Service, avatars which are integrated into messages may optionally talk in Gibberish. For example the Avatar-message received by 102, starts to talk in Gibberish when the messaging screen is opened. Users can assign different voices to their avatars using Avatar Web Portal.

A flow diagram of Avatar Messaging Service is shown in FIG. 6. In step 2000 messaging party 101 connects to Avatar Web Portal 155 and chooses an avatar which will be integrated in the message. The chosen avatar may be created by the user itself or selected from Avatar Gallery using Avatar Web Portal 155. In step 2001 Avatar Web Portal connects to Avatar Repository 105 requesting avatar related information about user 101 in turn, Avatar Repository sends chosen avatar model to Transcoder Server 405 in step 2002. After Transcoder Server 405 optimizes received avatar files in step 2003 and sends them back to Avatar Repository 105, user 101 receives optimized avatar files from Avatar Repository 105 and gets ready to use them in Avatar Messaging Service.

In step 2004, messaging party 101 sends an Avatar Message to messaged party 102 using his/her chosen avatar. In turn, message is received by Email Server 403 using SMTP in step 2005 to be delivered to party 102.

In step 2006, Notification Server 401 is triggered when party 101 sends a message to party 102. Upon being triggered, Notification Server 401 sends a notification message to party 102 in step 2007. After being notified, messaged party 102 connects to Email Server 403 using HTTP/HTTPs in step 2008 and downloads received Avatar Message(s) from Email Server 403 in step 2009. Messaged party 102 may download received Avatar Message(s) from Email Server 403 using POP3 and/or IMAP. Upon downloading process from Email Server 403 is finished, received Avatar Message(s) can be played on screen of messaged party 102's device.

By using speech-to-text and text-to speech techniques, spoken words of users are converted to text and text messages are converted into speech. Thus, users can send Avatar-messages without texting it. In Avatar-Messaging Service, emoticons are embedded into messages and they are not viewable by the receiving parties. Instead of showing emoticons in the message text, avatars do the corresponding actions and speak in a corresponding tone of voice in order to present emotions. Users can assign moods to their avatars for use in Avatar-Messaging Service.

In Avatar-Messaging Service, avatar animations/emotions can be triggered by user actions or context. For example, specific words appearing in the message context can trigger avatars for showing corresponding emotions. Users may use pre-selected default avatars for integrating into messages or different avatars associated with different parties to be messaged.

There are two reply modes in Avatar-Messaging Service: Reply and Action Reply. In Reply mode, the user sends a message wherein his/her avatar is integrated in. In Action Reply mode, users can interact with each other's avatars. Choosing Action Reply mode, enables the user to physically interact with other party's avatar through finger actions on the touchscreen of the communication device. For example, users can slap each other's avatars in the face through specific finger actions on the touchscreen. Using the Action Reply mode causes damage effects and other visible effects on the avatars which the actions are implemented on. Action Reply mode can be applied to Avatar-Calling Service as well using the same principles and components described above.

In one embodiment, different voice tones can be assigned to avatars. According to the user's demand, voice tones of avatars can be modified during an Avatar-Call and/or Avatar-Messaging. Users can choose from pre-defined voice options through Avatar Web Portal. Besides, users can send quotes from famous movies read by their avatars depending on service provider's set of offerings.

In one embodiment, users of IP clients can create visual changes/effects on the other party's avatars during and Avatar-Calling Service. For example, a user can bump/wobble the eyes of the other party's avatar and send it to the other party during an Avatar-Calling Service. Same techniques can be easily applied to Avatar Messaging Service using same principles and components.

CONCLUSION

A system and method has been shown in the above embodiments for the effective implementation of interactive avatars for telecommunication systems. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The above enhancements are implemented in various computing environments. For example, the present invention may be implemented on a conventional PC or equivalent, multi-nodal system (e.g., LAN) or networking system (e.g., Internet, WWW, wireless web). All programming and data related thereto are stored in computer memory, static or dynamic, and may be retrieved by the user in any of: conventional computer storage, display (e.g, CRT, LCD, etc.) and/or hardcopy (e.g., printed) formats. The programming of the present invention may be implemented by one having ordinary skill in the art of telecommunications and web programming.

The invention claimed is:

1. An avatar-calling service processing a call from a calling IP client to a called IP client wherein calling IP clients' avatar is integrated into said calling service, said service is accessible through said IP clients' communication device wherein said calling IP client with avatar has video calling and real-time rendering capabilities and said called IP client's end-user communication device has real-time rendering and video/graphics display capabilities, said calling IP client has an application which integrates avatar with lip and motion-syncs into avatar calling service, said avatar-calling service comprising:

an avatar call control server communicating with an avatar inserter using an HTTP/XML interface retrieving said calling IP client's avatar information from an avatar repository, said avatar repository storing avatars of users;

said avatar inserter retrieving said calling IP client's avatar information from said avatar repository and transferring said retrieved avatar information to said avatar call control server;

said avatar call control server sending said avatar information with calling information, wherein the avatar is an animated 2D or 3D digital representations of said IP client's user and said animated 2D and/or 3D avatars are synchronized to the user's lip, face and body movements in real time.

2. The method of claim 1, wherein said communication device is any of the following: smartphone, a software-based telephone, a cellular telephone, a personal computer (PC), a laptop, a personal digital assistant (PDA), an IP-based phone, a personal tablet computer.

3. The method of claim 2, wherein the communication device is haptic-capable.

4. The method of claim 1, wherein said Avatar-Calling service is one of the following: 3G call, 4G call, video call, VoIP call or video conferencing.

5. The method of claim 1, wherein the method further comprises sending emotions and facial expressions using in-band DTMF signaling.

6. The method of claim 1, wherein said calling party's voice is modified during an Avatar-Calling Service.

7. The method of claim 1, wherein the replying or called party's finger interactions on the avatar seen in the message or call on the touchscreen of said communication device are returned to said messaging or calling party in animated action form.

8. The method of claim 3, wherein said finger interactions are on a touchscreen, creating viewable effects and/or change the appearance of said avatars.

9. The method of claim 1, wherein avatars are customized by morphing one avatar into another avatar.

10. An avatar portal service providing an online editor to one or more IP clients wherein each of said IP clients create and customize digital avatars based on detected key facial features detected from at least one uploaded photograph of one or more subscribers associated with said IP clients, said portal service comprising:

an avatar web server storing data corresponding to digital avatars associated with said IP clients and preferences associated with subscribers associated with each of said IP clients and rendering an avatar portal interface to subscribers;

a photofit server creating the 3D model of uploaded photographs of said subscribers;

an avatar editor server rendering said user's avatars according to a plurality of customization operations;

a video renderer creating pre-encoded stock footages of said avatars;

an avatar repository receiving said pre-encoded stock footages and storing said uploaded photographs, avatars and pre-encoded stock footages of said subscribers; and said pre-encoded stock footages created by said video renderer being used in said avatar-calling service for lip, face and body movement synchronization operations.

11. The portal service of claim 10, wherein said IP client is implemented as part of any of the following communication devices: Smartphone, a software-based telephone, a cellular telephone, a personal computer (PC), a laptop, a personal digital assistant (PDA), an IP-based phone, a personal tablet computer.

12. The portal service of claim 10, wherein avatars are animated 2D or 3D digital representations of said IP client's user.

13. The portal service of claim 12, wherein said animated 2D and/or 3D avatars are synchronized to the users lip, face and body movements in real time.

14. The portal service of claim 10, wherein said users can create a profile, said profile comprising a set of user information including an address book, play-rules and preferences, which define how avatars are inserted into calling services.

15. The portal service of claim 10, wherein said portal service is used to create clothes and accessories for avatars via his/her IP client.

16. The portal service of claim 10, wherein said created clothes and accessories can be sold to or shared with other IP clients through said portal service.

17. The portal service of claim 10, wherein users can choose from pre-created avatars available on portal service.

18. The portal service of claim 10, wherein avatars are further customized by morphing one avatar into another avatar.

19. The portal service of claim 10, avatars are based on at least one uploaded photograph, by detecting and calculating key facial features automatically.

20. The portal service of claim 19, wherein hairstyle seen on said photograph of said user is detected and modeled automatically for use in created avatars.

21. The portal service of claim 19, wherein said users assign virtual human-like functions to avatars.

22. A computer-based method as implemented at a server facilitating communication between a first and second IP client, said method comprising:

said server receiving a first pre-assigned key at said server from said first IP client, said first IP client communicating with said second IP client, said server storing a plurality of avatars and a plurality of emotions, at least one avatar among said stored plurality of avatars in said server associated with said first IP client and each emotion associated with a pre-assigned key;

said server identifying a first emotion corresponding to said received first pre-assigned key;

said server retrieving data corresponding to said first emotion and modifying avatar associated with said first IP client to show said first emotion based on said retrieved data corresponding to said first emotion;

said server rendering said modified avatar associated with said first IP client showing said first emotion at said second IP client;

said server receiving a second pre-assigned key at said server from said first IP client;

said server identifying a second emotion corresponding to said received second pre-assigned key;

said server retrieving data corresponding to said second emotion and modifying avatar associated with said first IP client to show said second emotion based on said retrieved data corresponding to said second emotion; and said server rendering said modified avatar associated with said first IP client showing said second emotion at said second IP client, and where said first pre-assigned key and said second pre-assigned key is sent through In-band Dual-Tone Multi-Frequency Signaling (DTMF) and data corresponding to said first and second emotions are generated and stored in said server prior to said communication.

23. The computer-based method of claim 22, wherein said plurality of emotions are any of the following: happy, sad, scared, or surprised.

* * * * *